(12) United States Patent
Rüttimann

(10) Patent No.: US 6,845,932 B2
(45) Date of Patent: Jan. 25, 2005

(54) KITCHEN APPLIANCE FOR PREPARING FOOD

(75) Inventor: Max Rüttimann, Weinfelden (CH)

(73) Assignee: Maweva-Holding AG, Mettlen (CH)

( * ) Notice: Subject to any disclaimer, the term of this patent is extended or adjusted under 35 U.S.C. 154(b) by 183 days.

(21) Appl. No.: 10/266,573

(22) Filed: Oct. 9, 2002

(65) Prior Publication Data

US 2003/0071150 A1 Apr. 17, 2003

(30) Foreign Application Priority Data

Oct. 17, 2001 (DE) ............................... 101 51 231

(51) Int. Cl.$^7$ ............................................... B02C 17/02
(52) U.S. Cl. .......................... 241/92; 241/37.5; 241/296
(58) Field of Search .......................... 241/92, 37.5, 73, 241/282.2, 296; 366/331, 343; 99/348

(56) References Cited

U.S. PATENT DOCUMENTS

| | | | | |
|---|---|---|---|---|
| 4,113,188 A | * | 9/1978 | Belinkoff | 241/37.5 |
| 4,582,814 A | * | 4/1986 | Thomas | 501/136 |
| 5,129,589 A | * | 7/1992 | Papaleo et al. | 241/37.5 |
| 5,289,763 A | * | 3/1994 | Le Rouzic et al. | 99/503 |
| 5,735,193 A | * | 4/1998 | Chang | 99/494 |
| 6,089,746 A | * | 7/2000 | Martin | |
| 6,375,102 B1 | * | 4/2002 | Bouleau et al. | 241/37.5 |
| 6,604,455 B2 | * | 8/2003 | Areh et al. | 99/510 |
| 6,676,051 B2 | * | 1/2004 | Rebordosa et al. | 241/73 |

FOREIGN PATENT DOCUMENTS

| | | | |
|---|---|---|---|
| DE | 32 20 449 A1 | | 12/1983 |
| DE | 36 41 902 A1 | | 6/1988 |
| DE | 36 41 902 A | * | 6/1988 |
| DE | 697 02 034 T2 | | 4/1998 |
| DE | 197 37 130 A1 | | 3/1999 |
| DE | 100 01 455 A1 | | 7/2001 |
| WO | WO 02/28245 A1 | | 4/2002 |

* cited by examiner

*Primary Examiner*—Ed Tolan
(74) *Attorney, Agent, or Firm*—Venable LLP; Stuart I. Smith

(57) ABSTRACT

A plate-shaped insert is removably arranged in the receptacle receiving the processed food of a kitchen appliance or a kitchen device for processing food, and extends with its edge to the inner wall of the receptacle and tightly encloses the drive arbor or spindle of the tool. The drive arbor or spindle of the tool is connected, possibly captively, with the plate-shaped insert.

15 Claims, 5 Drawing Sheets

KITCHEN APPLIANCE FOR PREPARING FOOD

FIELD OF THE INVENTION

The invention relates to a kitchen appliance for preparing food, having a receptacle intended for receiving the food, a driven tool rotating inside the receptacle, and a motive source causing the tool to rotate which can be connected to the tool, wherein the tool is guided, or seated, by means of or on an arbor or a spindle arranged inside the receptacle.

BACKGROUND OF THE INVENTION

Kitchen appliances are customary in actual use, wherein a coaxial spindle is rotatably seated on the bottom of the receptacle and on which a tool is arranged, which rotates inside the receptacle and is driven by a motive source arranged outside of, particularly underneath, the receptacle, for example in the form of a drive motor. The spindle extends from the bottom into the interior of the receptacle, which is often enclosed by a protective sleeve formed on the bottom, hampers the removal of the processed food from the receptacle and is also in the way in an interfering manner when cleaning the receptacle. Basically the same applies to another construction of such kitchen appliances, wherein a rigid arbor is anchored in the bottom of the receptacle, projects into the interior of the receptacle and is used for seating or guiding a tool which is driven from a motive source extending with a driveshaft from above into the receptacle and capable of being coupled with the tool seated on the arbor. Hampering the removal of the food becomes greater and cleaning of the receptacle becomes the more difficult, the narrower the diameter of the mostly cylindrical cup- or urn-shaped receptacle. With a decreasing diameter of the receptacle, the radial width of the annular space located between the central arbor or spindle and the inner wall of the receptacle becomes less, with the result that it becomes difficult, or even impossible, for the user to enter this annular space with his entire hand. The user is forced to employ the aid of spatulas or scrapers for removing the processed food from the receptacle, which is cumbersome. In actual use it has moreover been found that for this reason the user, not infrequently because of laziness, uses unsuitable tools, such a metal spoons, knives and the like for removing the food, which quite often leads to damage of the receptacle which, as a rule, is made of plastic.

The device for comminuting food described in DE 36 41 902 C2 is a typical example of a kitchen appliance of the type described. With this device, a receptacle in the shape of a cup-shaped inner shell for receiving food is sealingly screwed together with an outer shell, which surrounds it and has supporting feet, and is closed by a lid, which is releasably connected with it by means of a quarter-turn fastener. A comminuting tool is rotatably seated via an appropriate bearing on the bottom of the inner shell and is connected with a spindle butt, which extends centered through the inner shell and is designed to be coupled with the driveshaft of a hand-held blender placed on a corresponding opening in the lid. Recessed grips on the outer shell make it possible to hold the device with one hand during operation. Essentially, the comminuted food can only be dumped out of the inner shell, wherein the removal of portions stuck on the inner wall is difficult, and cleaning of the inner shell is not easy, particularly because of the tool which is fixedly connected with it.

In connection with other kitchen appliances which are used as additional devices together with hand-held blenders, it is known to seat or guide the tool on a concentric arbor rigidly inserted into the bottom of the receptacle, and to couple it on the side opposite this arbor with the driveshaft of the hand-held blender placed on the lid of the receptacle. Although with this construction it is possible to remove the tool from the receptacle, removal of the processed food from the receptacle is not simple enough.

OBJECT AND SUMMARY OF THE INVENTION

It is therefore the object of the invention to provide relief here and to produce a kitchen appliance of the type mentioned at the outset, wherein the removal of the processed food from the receptacle and cleaning of the receptacle is made easier in comparison with known apparatus or devices of comparable construction.

The kitchen appliance in accordance with the invention has the characteristics of claim 1 for attaining this object.

The plate-shaped insert, which has been removably seated in the receptacle and whose edges substantially extend up to the inner wall of the receptacle and tightly enclose the arbor or spindle of the tool, can easily be pulled out of the receptacle at the end of the processing process, and in the process takes the processed food with it out of the receptacle, so that neither spatulas, spoons nor tools of this kind are required, even with restricted space conditions, such as occur with smaller types of correspondingly narrower diameter of the receptacle.

Depending on the particular construction of the kitchen appliance, the arbor can be rigidly connected with the plate-shaped insert, wherein the tool is rotatably seated on the arbor and for practical purposes has a coupling device for the motive source. This motive source can be, for example, a hand-held blender, which can be placed on the receptacle. In this case the arrangement has been advantageously made in such a way that the hand-held blender can be placed on a lid, which at least partially closes the receptacle, wherein the lid contains a gear, whose input is driven by the hand-held blender and whose output can be coupled with the tool, and which assures that the tool revolves at the number of revolutions practical for the respective processing process.

With another construction of the kitchen appliance, the spindle supporting the tool can be rotatably seated on the plate-shaped insert, so that in the course of removing the insert from the receptacle it is removed together with the insert and its seating means.

The plate-shaped insert can have a bent-up edge for keeping the processed food together during removal from the receptacle. Inter alia, it can be sealed against the inner wall of the receptacle, for which purpose the edge is provided with a sealing lip, or can be embodied as a such. Otherwise it is practical for the plate-shaped insert to be substantially flat, but cup-shaped embodiments are also conceivable.

To prevent the plate-shaped insert from revolving together with the tool in the course of processing the food, it is advantageous if the arrangement is made in such a way that the receptacle and/or the plate-shaped insert have means for fixing the insert against relative rotation in the receptacle. However, in this connection it should be noted that constructions of kitchen appliances also exist, wherein it can be useful to embody the plate-shaped insert so that it revolves together with the tool.

The insert, when removed together with its arbor or spindle from the receptacle, can be easily cleaned, the same as the receptacle itself. Furthermore, it can easily be handled when removing the processed food and does not offer any obstacles to the user when preparing the apparatus for a new operation, since it can be easily inserted into the receptacle.

It was already mentioned that kitchen appliances also exist in which the driveshaft of the tool is arranged to extend through the bottom of the receptacle, wherein as a rule the motive source is arranged underneath the receptacle. The plate-shaped insert used for such apparatus advantageously has a hollow arbor, through which the driveshaft extends and which prevents food from falling through the passage for the driveshaft when the insert loaded with processed food is removed from the receptacle.

All devices, apparatus and machines used for this purpose are understood to be kitchen appliances for processing food, regardless of their size or required power. In this case it does not matter whether these are independent machines, or merely an auxiliary device of another kitchen appliance, for example a hand mixer or a hand-held blender. However, the invention is of particular importance for devices which are distinguished by a comparatively narrow diameter of the receptacle, and therefore restricted space conditions for the removal of the processed food.

All customary types of processing, such as stirring, grinding, comminuting, grating, pureeing and the like are understood to constitute "processing" of food.

Exemplary embodiments of the subject of the invention are represented in the drawings.

DETAILED DESCRIPTION OF THE PREFERRED EMBODIMENTS

Figure 1:
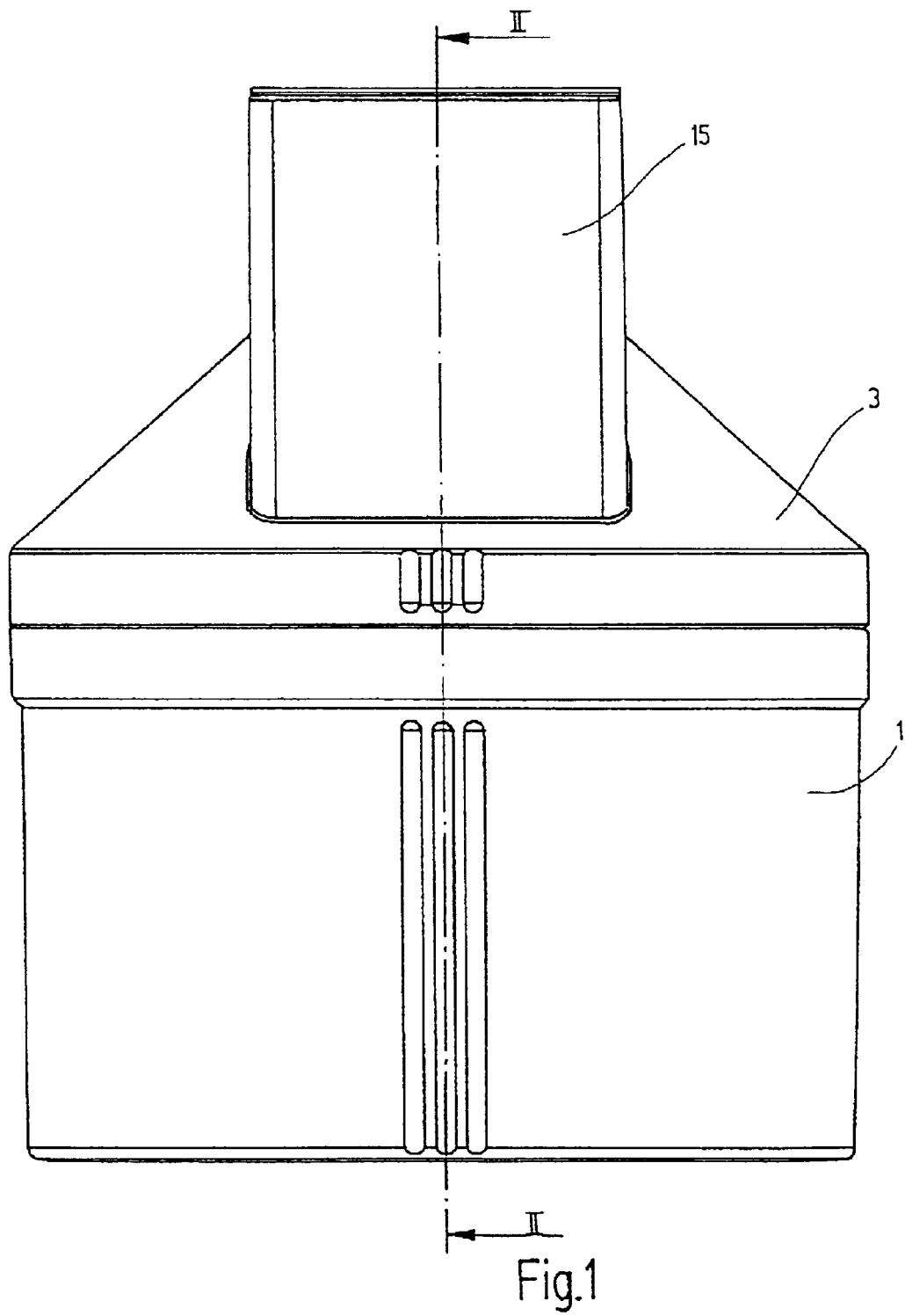
FIG. 1 shows a kitchen appliance in accordance with the invention in a lateral view.
Figure 2:
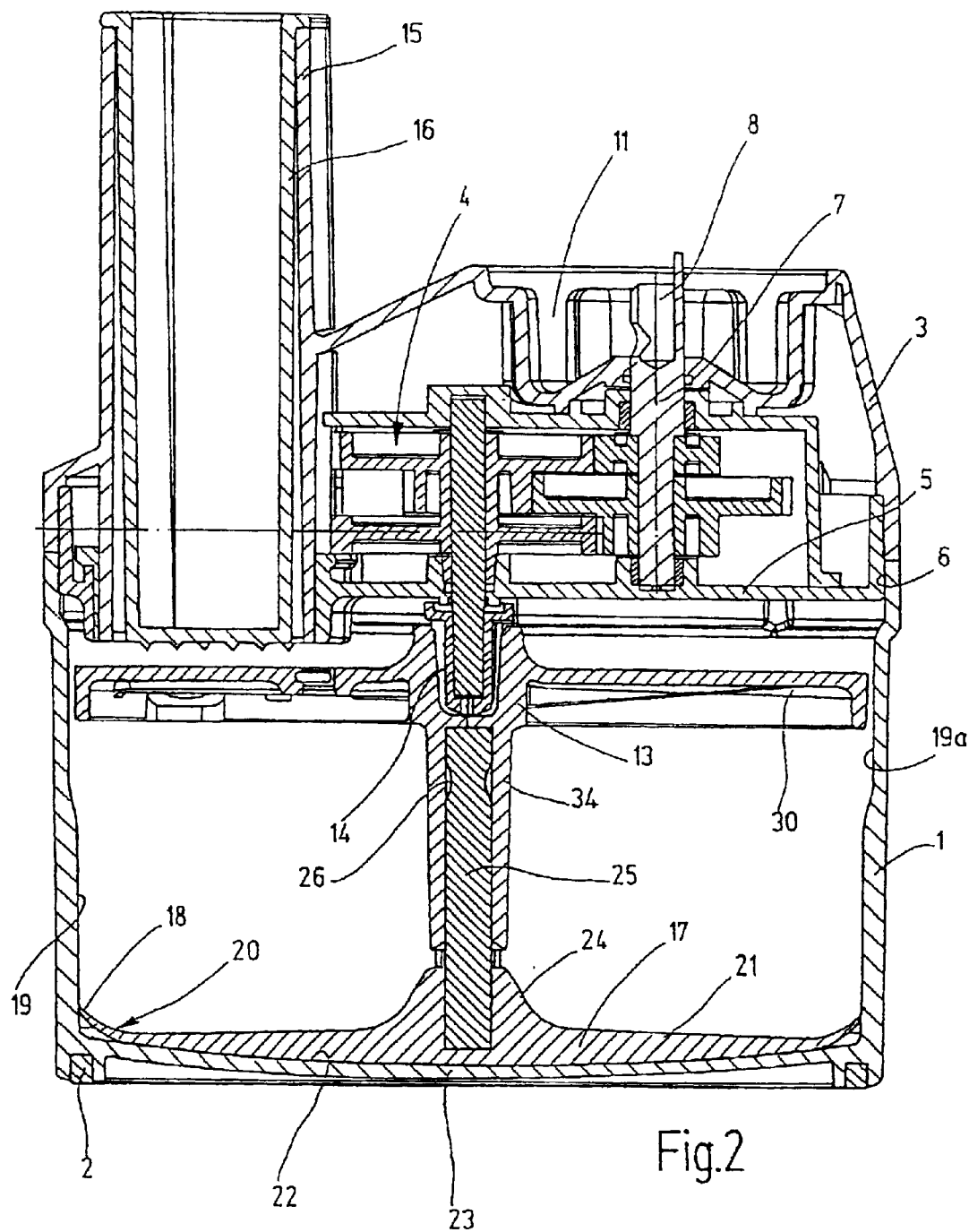
FIG. 2 is a lateral view of the kitchen appliance, in a section along the line II in FIG. 1.
Figure 3:
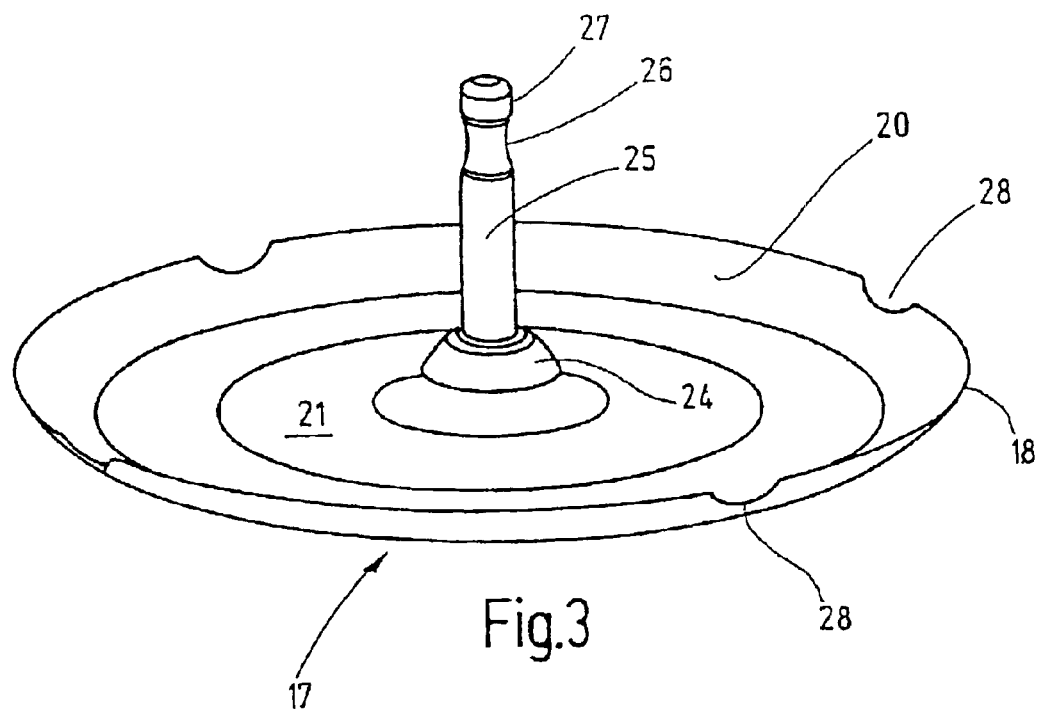
FIG. 3 is a perspective representation of the plate-shaped insert of the kitchen appliance in FIG. 2.
Figure 9:
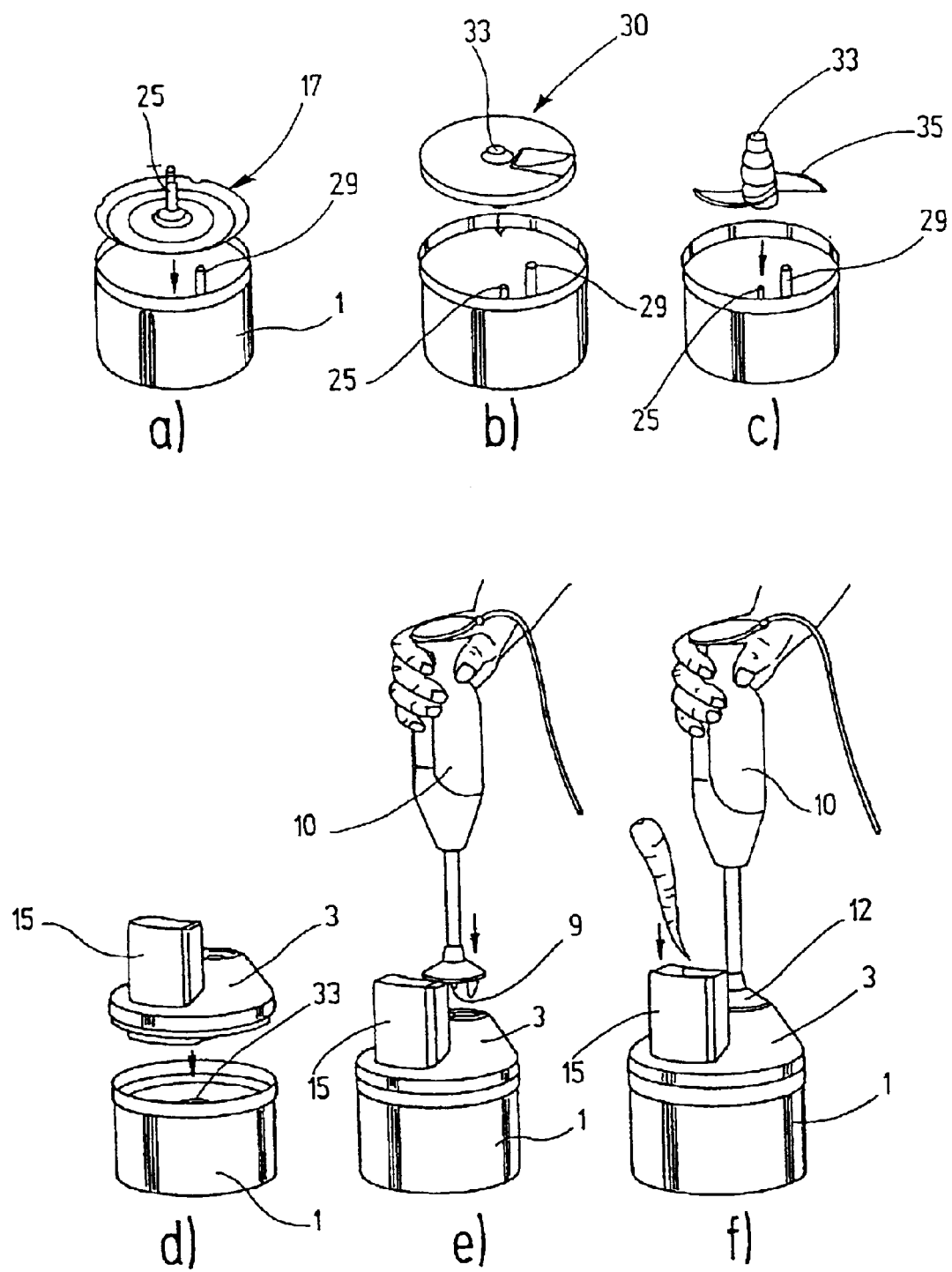
FIG. 9 is a schematic representation of the employment of the kitchen appliance in accordance with FIG. 1, schematically representing different stages of the assembly of parts in the course of its employment, each in a perspective view.

The kitchen appliance represented in FIGS. 1, 2, 3, which can also be called a kitchen machine, is used for processing food, for example for comminuting, cutting, grating, and the like. It has a substantially cylindrical receptacle 1, which is made of plastic, has support legs 2 and is closed by a lid 3. A spur gear 4 is housed in the dome-shaped lid 3 and is arranged on a cup-shaped support element 5, which has been fitted into the lid 3 and projects into the receptacle 1 at 6. The input shaft of the gear 4 is identified by 7 and has a shaft coupling 8 on its free end, which is embodied to be coupled with a driveshaft 9 of a hand-held blender 10, represented in FIG. 9. The hand-held blender 10 can be placed on the lid 3 in the way shown in FIGS. 9e and f, wherein the latter has a receiver 11, coaxial with the input shaft 7, for the protective hood 12 surrounding the driveshaft 9 of the hand-held blender 10.

When the lid 3 has been placed on the receptacle, the output shaft 13 of the gear 4, which is axis-parallel with the input shaft 7, is coaxial with the receptacle 1. It has a coupling element 14, projecting into the receptacle, for a tool revolving in the receptacle 1, which will be described in detail later.

A feed tube 15 for the food to be processed is provided in the lid 3 at a lateral distance from the output shaft 13 and leads into the receptacle 1 and contains a pusher 16 for the food.

A plate-shaped insert 17 has been inserted into the receptacle 1, which is shaped substantially cylindrical in the manner represented in FIGS. 2, 3, and whose edge extends at 18 to the inner wall 19 of the receptacle 1 and rests against it. The edge 18 of the plate-shaped insert 17 is bent upward toward the wall of the receptacle 1, wherein the edge area 20 of the insert 17 adjoining the edge 18 is embodied to taper in a wedge shape toward the edge 18. It is possible by means of an appropriate dimensioning and choice of material to achieve that the edge area 20 acts as a sealing lip, so that the edge 18 rests with a definite radial bias against the inner wall 19 of the receptacle 1 and seals the edge of the insert 17 against the inner wall 19. On its inner surface 21 adjoining the edge area 20, the plate-shaped insert 17 is arched, or substantially flat, while its outside 22 is matched to the slightly concave shape of the bottom 23 of the receptacle 1, so that the insert 17 rests against the inside of the bottom 23 toward the upward bent edge 20.

Figure 4:
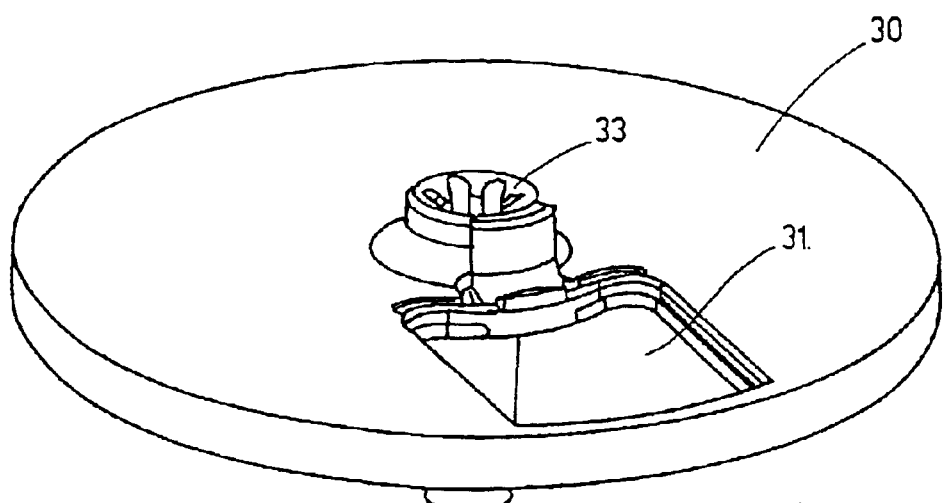
FIG. 4 is a perspective schematic representation of a tool in the form of a grating disk of the kitchen appliance in FIG. 2.
Figure 5:
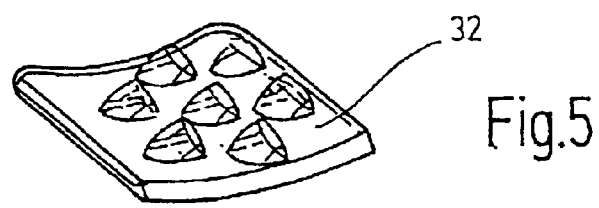
FIG. 5 is a perspective representation of a grating insert for the grating disk in FIG. 4.

The plate-shaped insert 17 made of plastic is embodied with a hub 24, which is formed on it and contains its central axis, into which a cylindrical arbor 25 made of steel has been coaxially inserted. In the area of its free end, the arbor 25 is embodied with a flat annular groove 26, which is substantially in the form of an arc of a circle and is adjoined by a rounded end section 27, which is shaped in such a way that it makes the placement of a tool on the arbor 25 easier. In the exemplary embodiment represented in FIG. 4, the plate-shaped insert 17, which has been removably inserted into the receptacle 1, has cutouts 28 on its circumference, which cooperate in an interlocking manner with ribs 29 (FIGS. 7, 8) embodied on the inner wall 19 of the receptacle 1 and constitute a fixation against relative rotation of the insert 17 in the receptacle 1. The plate-shaped insert 17 is accurately centered in the receptacle 1 by means of its shape and of the edge 18 extending to the inner wall 19 of the receptacle. A tool has been placed on the arbor 25 of the plate-shaped insert 17 which, in the exemplary embodiment represented in FIGS. 1, 2, is a grating disk 30, whose details which are of interest here can be taken from FIGS. 4 and 5. On a location, which is at a radial distance from its axis, the cylindrical grating disk 30 has a through-opening 34, into which the grating insert 32 can be inserted. On its top, it is embodied with a coaxial coupling element 33 which, together with the coupling element 14 of the gear 4, constitutes an interlocking plug connection. The grating disk 30 has a coaxial seating sleeve 34 on its underside, by means of which it is rotatably seated and guided on the arbor 25 of the plate-shaped insert 17. The handling of the plate-shaped insert 17, and the operation of the device described, can be particularly understood from FIG. 9:

In preparation for processing food, the plate-shaped insert 17 is inserted into the open receptacle, whose lid 3 was removed (FIG. 9a). The bearing sleeve 34 of the tool in the form of a grating disk 30 is placed on the vertical arbor 25 of the plate-shaped insert 17, which was brought together with it into the receptacle 1 (FIG. 9b). Subsequently the lid 3, whose gear output shaft 13 is coupled, fixed against relative rotation, with the coupling element 33 of the grating disk 30, is placed on the receptacle 1 (FIG. 9d). The hand-held blender 10 can be placed on the lid 3 (FIGS. 9e, f), wherein the driveshaft 9 is coupled with the gear input shaft 7 via the coupling 8, so that the device is ready for operation.

FIG. 9c shows an alternative embodiment of the tool in the form of a so-called cutter 35 for comminuting food, whose coupling element is also identified by 33 and which is again placed on the arbor 25 of the plate-shaped insert 17.

For removing the food from the receptacle 1, which was introduced through the feed tube 15 and processed by means of the grating disk 30, after removing the lid 3 and the grating disk 30 the plate-shaped insert 17 is simply pulled out of the receptacle 1 by its arbor 25, wherein the grated material is heaped on the insert 17 and kept on it by the high-arched edge 18. In the course of being pulled out of the receptacle 1, the edge 18 of the insert 17 slides along the inner wall 19 of the receptacle 1, so that no part of the grated material can fall downward. In the area 19a, which adjoins the receptacle opening, the inner wall 19 is made with a slightly larger diameter in order to ease the removal from, and particularly the return insertion of the plate-shaped insert 17 into the receptacle 1. The empty receptacle 1 can be easily cleaned, because the arbor 25 was removed along with the plate-shaped insert 17. Cleaning of the plate-shaped insert 17 also poses no problems.

Figure 6:
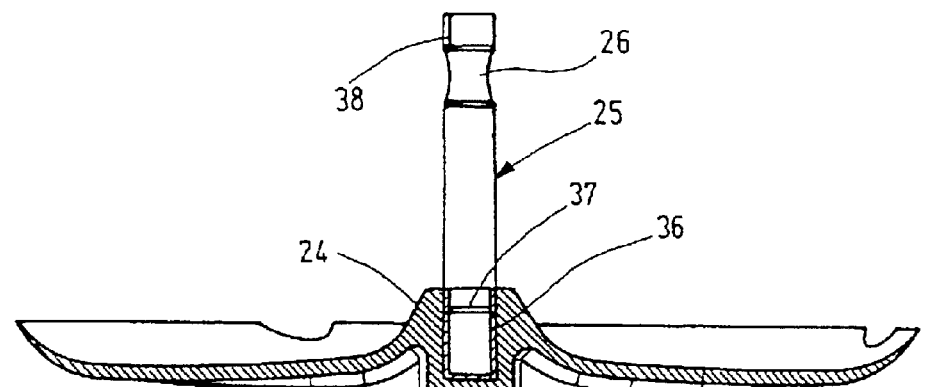
FIG. 6 is lateral view in axial section of the plate-shaped insert for a kitchen appliance in accordance with the invention in a modified embodiment.

FIG. 6 shows a modified embodiment of the plate-shaped insert 17, wherein the arbor 25 is rotatably seated in the hub 24 by means of a bearing bush 36. It is lifted out of the receptacle 1 together with the bearing bush 36 and the processed food lying on the plate-shaped insert 17. A retaining ring indicated at 37 prevent the arbor 25 from being loosened from the insert 17. In this case the tool can be set, fixed against relative rotation, on the arbor 25 constituting the spindle and can be connected with the latter by means of a taper key indicated at 38. In this embodiment the arbor 25 is connected, fixed against relative rotation, with the gear output shaft 13 (FIG. 2).

Figure 7:
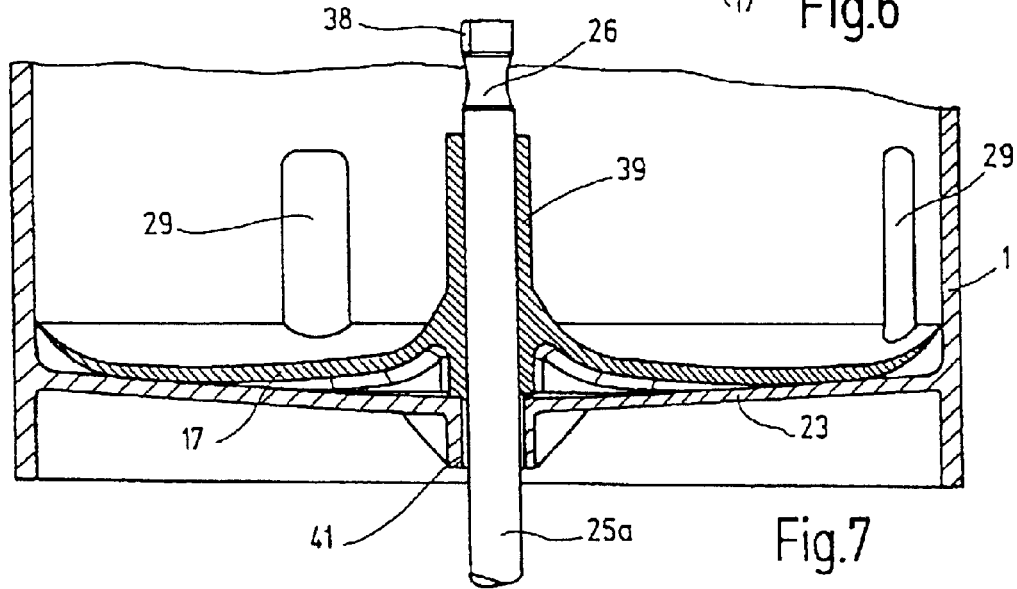
FIGS. 7 and 8 represent two modified embodiments of the receptacle of a kitchen appliance in accordance with the invention with appropriately modified plate-shaped inserts, each in axial section in a lateral view.
Figure 8:
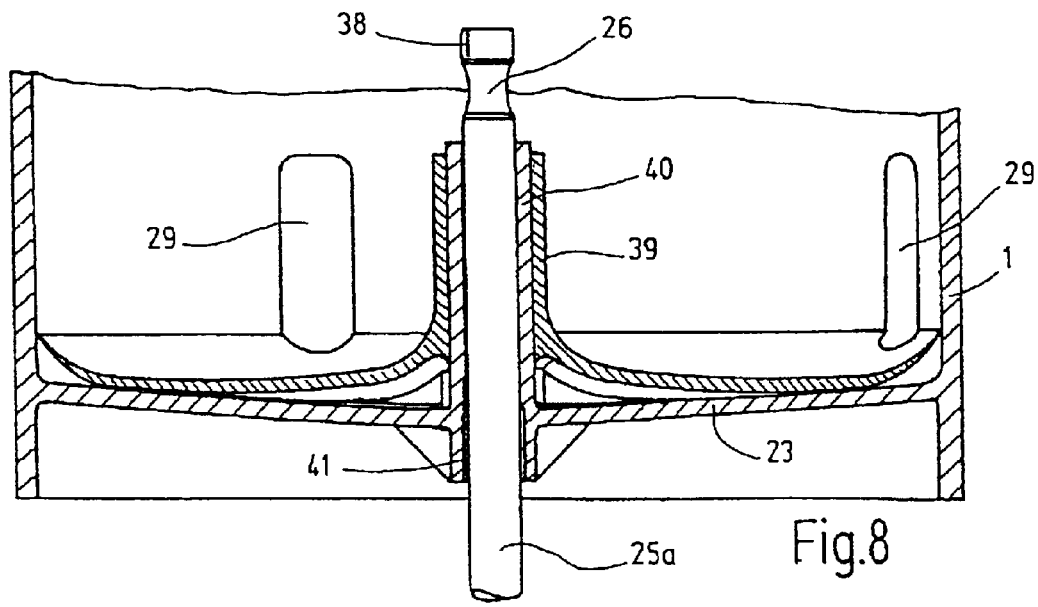

Finally, the concept of the invention can also be employed for kitchen appliances or devices in which the driveshaft 25a is arranged projecting through the bottom 23 of the receptacle 1, such as represented in FIGS. 7, 8. In this case the driveshaft 25a is coupled with a motive source, not further represented in these drawing figures, which is either arranged underneath the receptacle 1, or is releasably connected from above with the driveshaft 25a. In the embodiment in accordance with FIG. 7, the plate-shaped insert 17 is embodied with a coaxial sleeve 39 formed on it, which encloses the driveshaft 25a and makes the removal of the insert 17 from the receptacle 1 easier.

With the embodiment in accordance with FIG. 8, the driveshaft is conducted through a cylindrical bearing sleeve 40, which is formed on the receptacle bottom 23 and projects into the interior of the receptacle. In this case the coaxial sleeve 39 formed on the plate-shaped insert 17 is embodied with a diameter which makes it possible to push the sleeve 39 on the bearing sleeve 40. The same as with the embodiment in accordance with FIG. 7, the driveshaft 25a itself is sealed at 41 against the receptacle bottom 23 and possibly seated there.

Although with the embodiments in accordance with FIGS. 7, 8 the driveshaft 25a remains in the receptacle 1 after the removal of the plate-shaped insert 17 from the receptacle 1, with these types of kitchen appliances the plate-shaped insert 17 also provides the advantage of an eased removal of the processed food from the receptacle 1.

A plate-shaped insert is removably arranged in the receptacle receiving the processed food of a kitchen appliance or a kitchen device for processing food, and extends with its edge to the inner wall of the receptacle and tightly encloses the drive arbor or spindle of the tool. The drive arbor or spindle of the tool is connected, possibly captively, with the plate-shaped insert.

What is claimed is:

1. A kitchen appliance for processing food, comprising:
a receptacle intended for receiving the processed food, the receptacle having an inner side wall and a bottom with an inside and an outside;
a driven tool rotatably supported to rotate within the receptacle;
a motive source to rotate the tool;
a plate-shaped insert removably located in the receptacle, the insert resting on the inside of the receptacle bottom and having
a perimeter edge that closely follows the inner side wall of the receptacle,
a central axis, and
an elongate member coaxial with the central axis and extending from the insert into the receptacle,
wherein the insert is for receiving the food processed by the tool and for removing from the receptacle with the processed food thereon.

2. The kitchen appliance in accordance with claim 1, wherein an arbor is rigidly connected with the plate-shaped insert, and the tool is rotatably seated on the arbor.

3. The kitchen appliance in accordance with claim 2, wherein the tool has a coupling device for the motive source.

4. The kitchen appliance in accordance with claim 1, wherein a spindle of the tool is arranged so that it projects through the bottom of the receptacle.

5. The kitchen appliance in accordance with claim 4, wherein the plate-shaped insert supports a sleeve, through which the spindle extends.

6. The kitchen appliance in accordance with claim 1, wherein a spindle supporting the tool is rotatably seated on the plate-shaped insert.

7. The kitchen appliance in accordance with claim 1, wherein the plate-shaped insert has a bent-up edge.

8. The kitchen appliance in accordance with claim 1, wherein the plate-shaped insert is arched.

9. The kitchen appliance in accordance with claim 1, wherein the plate-shaped insert is flat, at least in some areas.

10. The kitchen appliance in accordance with claim 1, wherein the receptacle and/or the plate-shaped insert have means for fixing the insert in the vessel in a manner fixed against relative rotation.

11. The kitchen appliance in accordance with claim 1, wherein the motive source is a hand-held blender, which can be placed on the receptacle.

12. The kitchen appliance in accordance with claim 11, wherein the hand-held blender can be placed on a lid, which closes the receptacle off at least partially, and the lid contains a gear, whose input side is driven by the hand-held blender and whose output side can be coupled with the tool.

13. The kitchen appliance in accordance with claim 1, wherein the plate-shaped insert is sealed against the inner side wall of the receptacle.

14. The kitchen appliance in accordance with claim 1, wherein the plate-shaped insert is designed to revolve with the tool.

15. A plate-shaped insert for use with a kitchen appliance for processing food, the appliance having (a) a receptacle intended for receiving the processed food and having an inner side wall and a bottom with an inside and an outside, (b) a driven tool rotatably supported to rotate within the receptacle, and (c) a motive source to rotate the tool, the insert comprising:

a perimeter edge for closely following the inner side wall of the receptacle;

a central axis; and an elongate member coaxial with the central axis and extending from the insert, the elongate member being for extending into the receptacle, wherein the insert is for removably locating in the receptacle and for resting on the inside of the receptacle bottom, and is for receiving the food processed by the tool and for removing from the receptacle with the processed food thereon.

* * * * *